L. R. POSCHADEL.
CRANK CASE OIL TRAP.
APPLICATION FILED MAR. 5, 1918.
1,303,111.
Patented May 6, 1919.
2 SHEETS—SHEET 1.
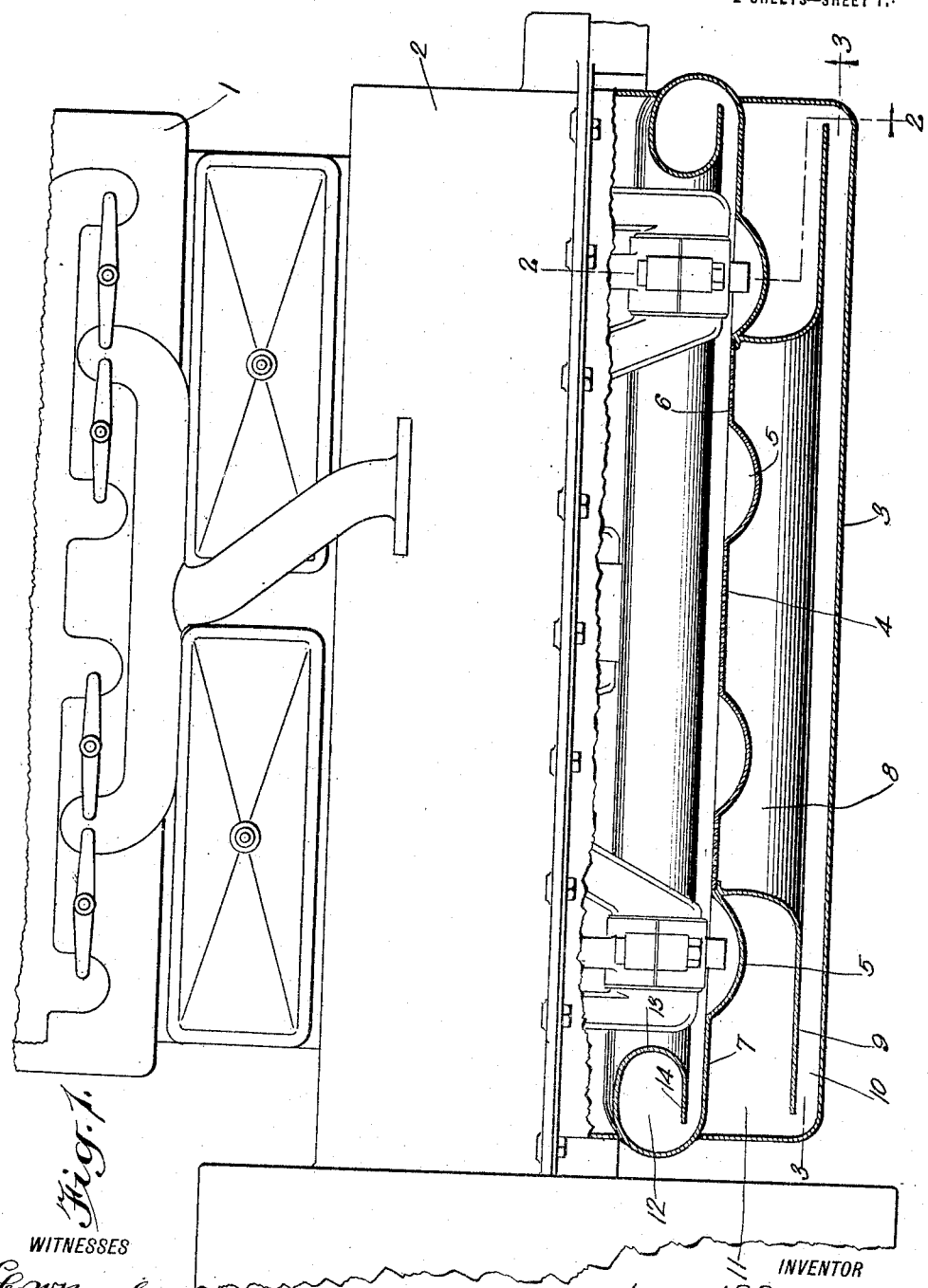
WITNESSES
INVENTOR
Leonard R. Poschadel
BY
ATTORNEYS L. R. POSCHADEL.
CRANK CASE OIL TRAP.
APPLICATION FILED MAR. 5, 1918.
1,303,111.
Patented May 6, 1919.
2 SHEETS—SHEET 2.
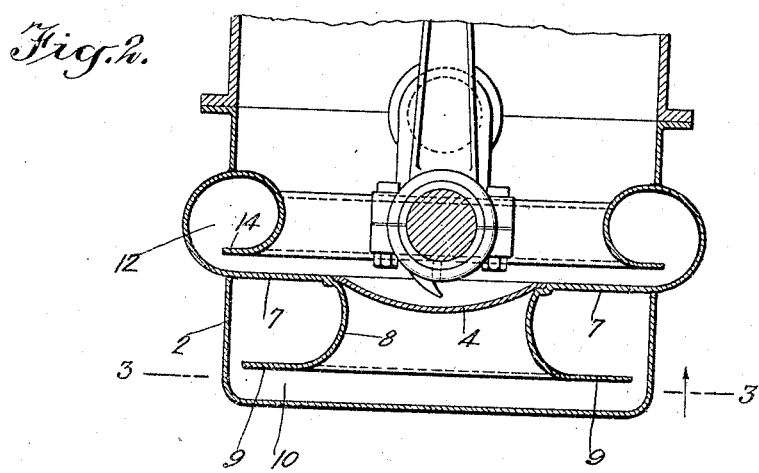
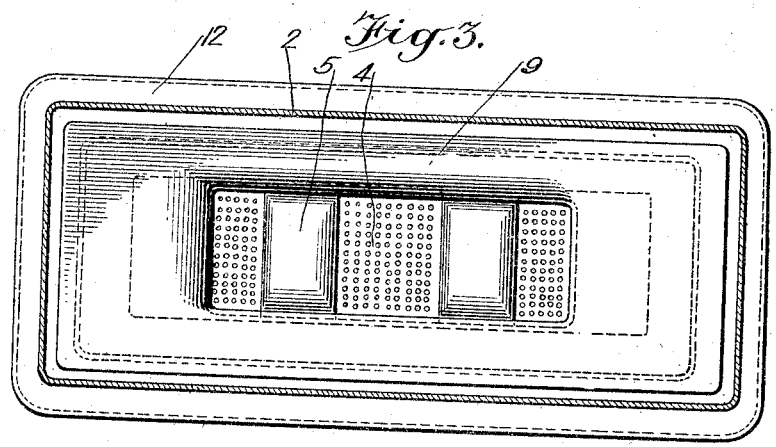
WITNESSES
INVENTOR
Leonard R. Poschadel
BY
ATTORNEYS

UNITED STATES PATENT OFFICE.

LEONARD R. POSCHADEL, OF NEW YORK, N. Y.

CRANK-CASE OIL-TRAP.

1,303,111.

Specification of Letters Patent. Patented May 6, 1919.

Application filed March 5, 1918. Serial No. 220,505.

*To all whom it may concern:*

Be it known that I, LEONARD R. POSCHADEL, a citizen of the United States, and a resident of the city of New York, borough of Manhattan, in the county and State of New York, have invented a new and Improved Crank-Case Oil-Trap, of which the following is a full, clear, and exact description.

This invention relates to internal combustion engines and has for an object the provision of an improved construction for the crank casing whereby the lubricating oil therein is continually trapped regardless of the position of the engine.

Another object in view is the provision of a trap for the crank casing of the engine which will trap the lubricating oil in the casing when the engine is inclined in any direction, or is upside down.

A still further object of the invention, more specifically is the provision in a crank casing of a trap member arranged at the ends and sides so as to receive the oil as the engine moves from a horizontal position or from one position to another and to maintain the oil until the engine moves back to its correct horizontal position.

In the accompanying drawings:

Figure 1 is a fragmentary side view of an internal combustion engine with certain parts broken away for better illustrating one embodiment of the invention.

Figure 2 is a fragmentary transverse sectional view through Fig. 1 on line 2—2.

Fig. 3 is a horizontal sectional view through Figs. 1 and 2 on lines 3—3 in both figures, the same being on a slightly reduced scale.

In constructing the invention the same may be formed in widely different shapes so as to conform to different shapes of crank casings and different shapes of engines. The trap is intended primarily for engines used in the air service, but if desired may be used on engines for other services without departing from the spirit of the invention. In the drawings one embodiment of the invention is shown, same being illustrated in connection with a conventional form of engine in order to illustrate the principle involved.

Referring to the accompanying drawings by numerals, 1 indicates an engine of any desired kind and 2 the crank casing. The lower part 3 of the crank casing, usually termed the sump, or oil container, coacts with the invention while acting in its usual capacity for receiving the oil and supporting the same until removed by a pump already in use, or preferred structure which may be placed at any desired point.

As shown in Fig. 1 the division plate 4 is provided with the usual depressions 5 for receiving the connecting rod down at the right in Fig. 1, so as to provide the proper splash, while between these depressions suitable apertures 6 are provided so that the excess oil may freely flow into the container 3. Ordinarily if an engine provided with the division plate 4 was used in an airplane and turned upside down the oil would all flow downwardly under the action of gravity and into the various cylinders. This is, of course, more or less objectionable, though it may not prevent the engine from functioning to a certain extent. However, to secure the best results it is desired to prevent an excessive supply of oil, and in order to do this a trap is provided for receiving the oil from the container 3 when the engine begins to move from a horizontal plane, and holds the oil away from the cylinders when the engine is inverted or upside down. To accomplish this the division plate 4 is made solid from the end depression 5 at 7, in fact solid from the end depression 5 at 7, in fact solid section 7 extends entirely around on all sides of the compartment 5 as will be observed from Figs. 1 and 2. A depending wall or flange 8 is connected to the division member or plate 4 at a distance from the ends and sides, said depending flanges being changed in direction when nearing the bottom of the container 3 so as to become substantially parallel therewith and form an overhanging section 9 whereby there is presented a passageway 10 entirely around the bottom of the container 3 so that when the engine begins to tilt the oil may flow into the compartment 11, which compartment extends entirely around the container and is of ample size for receiving all of the lubricating oil. When the oil has reached the compartment 11 it is held therein even though the engine is turned on either end or is turned over. In addition to providing compartment 11 for the oil in the container or sump 3, a compartment 12 is provided above the division plate 4. This compartment is caused by forming a solid section 7 so as to extend outwardly and upwardly and then in a coil structure for providing a wall 13 and horizontal or overhanging section 14.

It will thus be seen that means will be provided above and below the division plate 4 for automatically and instantly receiving the lubricating oil supplied to the casing 2 whenever the engine moves from a horizontal position, thus insuring the parts against an over supply of lubricating oil. It will also be noted that as soon as the engine again assumes a horizontal, or substantially horizontal position the oil will automatically and instantly flow back to its former position so that the parts will function in the usual manner.

What I claim is:

1. In a device of the character described, the combination with a crank casing of an internal combustion engine of means for pocketing or trapping lubricating oil therein when the engine is upside down, said means forming a plurality of chambers at the side and adjacent the bottom of the casing.

2. In a device of the character described, the combination with an engine provided with a crank casing of a trap arranged in said crank casing forming a pocket at the ends and sides of the casing for receiving the lubricating oil therefrom when the engine leaves a horizontal position.

3. In a device of the character described, the combination with an engine provided with a crank casing of a trap arranged in said casing, said trap comprising a division plate having a section adjacent the casing solid, and a depending flange member formed with an overhanging section for producing a pocket or chamber on all sides of the casing for receiving the lubricating oil when the engine has moved from a horizontal position.

4. An oil trap for crank casings comprising an inclosing member arranged in the casing formed with walls coacting with the walls of the casing for producing an annular chamber with an annular opening adjacent the casing merging into a chamber at the bottom of the casing.

5. In a device of the character described, the combination with an engine having a crank casing of a division plate in the casing formed with splashing depressions and openings through which the excess oil passes, a trap structure having an upper wall acting as an annular continuation of said division plate, and a lower wall arranged parallel with the bottom of said casing, said lower wall merging into an upstanding flange connected to the inner edge of said annular upper wall, said lower wall falling short of reaching the casing whereby there will be provided an annular opening from the casing into the trap or pocket.

6. The combination with an engine provided with a crank casing, a division plate formed with splash depressions and apertures of a lubricating oil trap arranged beneath said division plate, and a lubricating oil trap arranged around said division plate, said traps being adjacent the walls of said casing.

7. The combination with an engine having a crank casing of a lubricating oil trap arranged in said crank casing provided with a central solid member, a substantially coiled upper section, a substantially coiled lower section for producing upper and lower chambers having entrances near one end, said coils being of such a shape as to provide openings at the bottom whereby when the engine leaves a horizontal position the oil will run into the pockets or traps caused by said coiled sections.

8. The combination with an engine provided with a crank casing of a division plate of such a structure as to provide for a splashing system, a trap for the splash oil and excess oil, said trap extending entirely around the casing, said trap being formed substantially S-shaped in cross section with a central solid wall, an upper coiled portion and a lower coiled portion for producing upper and lower pockets, both of said pockets having openings adjacent the walls of the casing near the end of the pockets farther from the center of the casing, whereby when the engine leaves the horizontal in any direction the oil will run automatically into said pockets and be retained therein until the engine again assumes a horizontal position.

LEONARD R. POSCHADEL.

Copies of this patent may be obtained for five cents each, by addressing the "Commissioner of Patents, Washington, D. C."